US 9,025,704 B2

(12) United States Patent
Beckman et al.

(10) Patent No.: US 9,025,704 B2
(45) Date of Patent: May 5, 2015

(54) METHODS AND APPARATUS FOR GENERATING DEMODULATION CANDIDATES USING VECTOR CANDIDATE SAMPLING (VCS)

(71) Applicant: QUALCOMM Incorporated, San Diego, CA (US)

(72) Inventors: James E. Beckman, La Jolla, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/782,216

(22) Filed: Mar. 1, 2013

(65) Prior Publication Data
US 2014/0064416 A1 Mar. 6, 2014

Related U.S. Application Data (60) Provisional application No. 61/694,412, filed on Aug. 29, 2012.

(51) Int. Cl.
H04L 27/06 (2006.01)
H04L 25/02 (2006.01)
H04L 25/03 (2006.01)
H04B 7/04 (2006.01)

(52) U.S. Cl.
CPC .......... *H04L 25/02* (2013.01); *H04L 25/03178* (2013.01); *H04L 25/03305* (2013.01); *H04B 7/0413* (2013.01); *H04L 25/03318* (2013.01)

(58) Field of Classification Search
CPC . H04L 25/01; H04L 25/067; H04L 25/03286; H04L 25/03318; H04L 27/2601; H04L 27/38; H04L 27/03178; H04B 7/0413

USPC ................. 375/260, 262, 267, 340, 341, 347; 714/794, 795, 796
See application file for complete search history.

(56) References Cited

U.S. PATENT DOCUMENTS

| 7,321,644 B2 * | 1/2008 | Love et al. ..................... 375/341 |
| 7,720,181 B2 | 5/2010 | Park et al. |
| 7,864,896 B2 * | 1/2011 | Hwang et al. ................. 375/341 |
| 8,009,771 B2 | 8/2011 | Dangi et al. |

(Continued)

OTHER PUBLICATIONS

International Search Report and Written Opinion—PCT/US2013/052357, International Search Authority—European Patent Office, Nov. 5, 2013.

*Primary Examiner* — Leon Flores
(74) *Attorney, Agent, or Firm* — Patterson & Sheridan, L.L.P.

(57) ABSTRACT

Certain aspects of the present disclosure relate to techniques for generating likely demodulation candidates using Vector Candidate Sampling (VCS). VCS is used to generate high likelihood candidates for Multiple Input Multiple Output (MIMO) demodulation that approaches optimal maximum a posteriori (MAP) performance with reasonable complexity. A receive data vector is recorded corresponding to a signal received at a MIMO receiver. A plurality of likely candidates are determined for MIMO demodulation via VCS, based at least on the receive data vector. Determining the likely candidates may include perturbing the receive data vector for each candidate based on a pre-determined perturb vector, and estimating a corresponding transmit data vector based at least on the perturbed receive data vector for the candidate and an estimator matrix, wherein the likely candidate comprises the estimated data vector.

20 Claims, 8 Drawing Sheets

(56) References Cited

U.S. PATENT DOCUMENTS

| | | |
|---|---|---|
| 8,238,488 B1 | 8/2012 | Lee et al. |
| 8,654,882 B2 * | 2/2014 | Lee et al. .................... 375/267 |
| 8,699,605 B2 * | 4/2014 | Yang ............................ 375/267 |
| 2008/0152032 A1 | 6/2008 | Lee et al. |
| 2009/0285342 A1 | 11/2009 | Suh et al. |
| 2012/0128085 A1 | 5/2012 | Seyama |

* cited by examiner

METHODS AND APPARATUS FOR GENERATING DEMODULATION CANDIDATES USING VECTOR CANDIDATE SAMPLING (VCS)

The present Application for Patent claims priority to U.S. Provisional Application No. 61/694,412, entitled "METHODS AND APPARATUS FOR GENERATING DEMODULATION CANDIDATES USING VECTOR CANDIDATE SAMPLING (VCS)," filed Aug. 29, 2012, and assigned to the assignee hereof and hereby expressly incorporated by reference herein

BACKGROUND

1. Field

Certain aspects of the present disclosure generally relate to wireless communications and, more specifically, to methods and apparatus for generating demodulation candidates using Vector Candidate Sampling (VCS).

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may observe interference due to transmissions from neighbor base stations. On the uplink, a transmission from the UE may cause interference to transmissions from other UEs communicating with the neighbor base stations. The interference may degrade performance on both the downlink and uplink.

SUMMARY

Certain aspects of the present disclosure provide a method for wireless communications performed by a Multiple-Input Multiple-Output (MIMO) receiver. The method generally includes receiving a signal at the MIMO receiver, recording a receive data vector corresponding to the received signal, and determining a plurality of likely candidates for MIMO demodulation via Vector Candidate Sampling (VCS), based at least on the receive data vector.

Certain aspects of the present disclosure provide an apparatus for wireless communication by a Multiple-Input Multiple-Output (MIMO) receiver. The apparatus generally includes means for receiving a signal, means for recording a receive data vector corresponding to the received signal, and means for determining a plurality of likely candidates for MIMO demodulation via VCS, based at least on the receive data vector.

Certain aspects of the present disclosure provide an apparatus for wireless communication by a Multiple-Input Multiple-Output (MIMO) receiver. The apparatus generally includes at least one processor and a memory coupled to the at least one processor. The at least one processor is generally configured to receive a signal at the MIMO receiver, record a receive data vector corresponding to the received signal, and determine a plurality of likely candidates for MIMO demodulation via VCS, based at least one the receive data vector.

Certain aspects of the present disclosure provide a computer program product for wireless communication by a Multiple-Input Multiple-Output (MIMO) receiver. The computer program product generally includes a computer-readable medium including instructions for receiving a signal at the MIMO receiver, recording a receive data vector corresponding to the received signal, and determining a plurality of likely candidates for MIMO demodulation via VCS, based at least one the receive data vector.

Various aspects and features of the disclosure are described in further detail below.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Example Wireless Network

Figure 1:
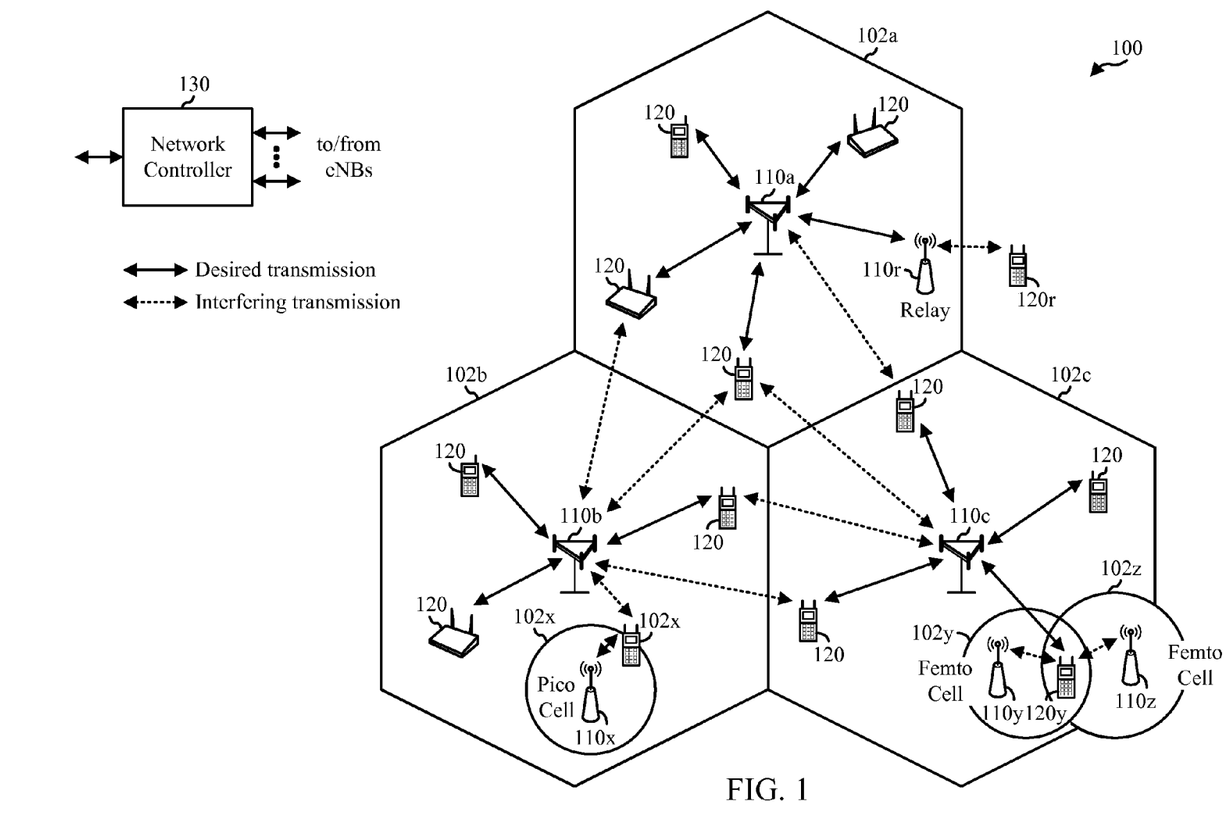
FIG. 1 is a block diagram conceptually illustrating an example of a wireless communications network in accordance with certain aspects of the present disclosure.

FIG. 1 shows a wireless communication network 100, which may be an LTE network. The wireless network 100 may include a number of evolved Node Bs (eNBs) 110 and other network entities. An eNB may be a station that communicates with user equipment devices (UEs) and may also be referred to as a base station, a Node B, an access point, etc. Each eNB 110 may provide communication coverage for a particular geographic area. The term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB. In the example shown in FIG. 1, eNBs 110a, 110b, and 110c may be macro eNBs for macro cells 102a, 102b, and 102c, respectively. eNB 110x may be a pico eNB for a pico cell 102x. eNBs 110y and 110z may be femto eNBs for femto cells 102y and 102z, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with eNB 110a and a UE 120r in order to facilitate communication between eNB 110a and UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 watts) whereas pico eNBs, femto eNBs, and relays may have a lower transmit power level (e.g., 1 watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz, and there may be 1, 2, 4, 8, or 16 subbands for system bandwidth of 1.25, 2.5, 5, 10, or 20 MHz, respectively.

Figure 2:
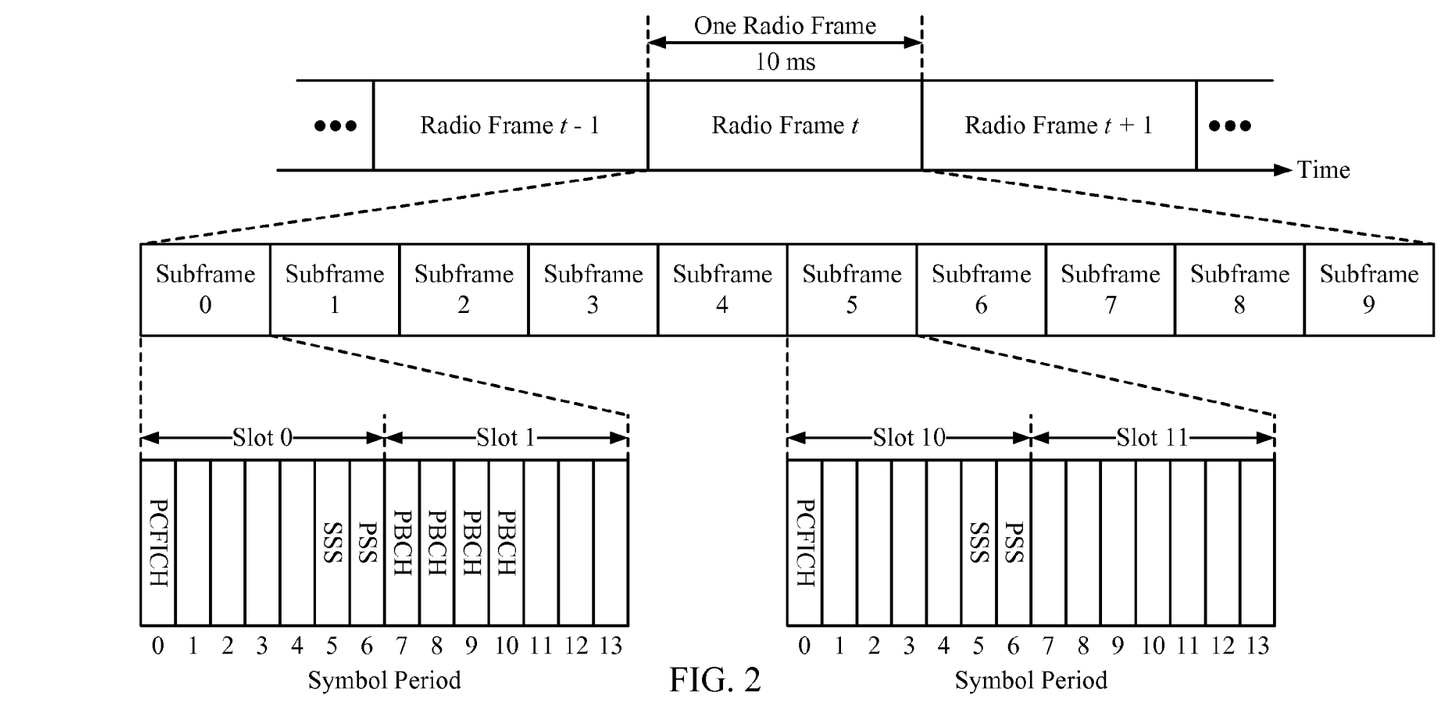
FIG. 2 is a block diagram conceptually illustrating an example of a frame structure in a wireless communications network in accordance with certain aspects of the present disclosure.

FIG. 2 shows a frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., L=7 symbol periods for a normal cyclic prefix (as shown in FIG. 2) or L=6 symbol periods for an extended cyclic prefix. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP), as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as shown in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe (not shown in FIG. 2). The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 32, or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 2A:
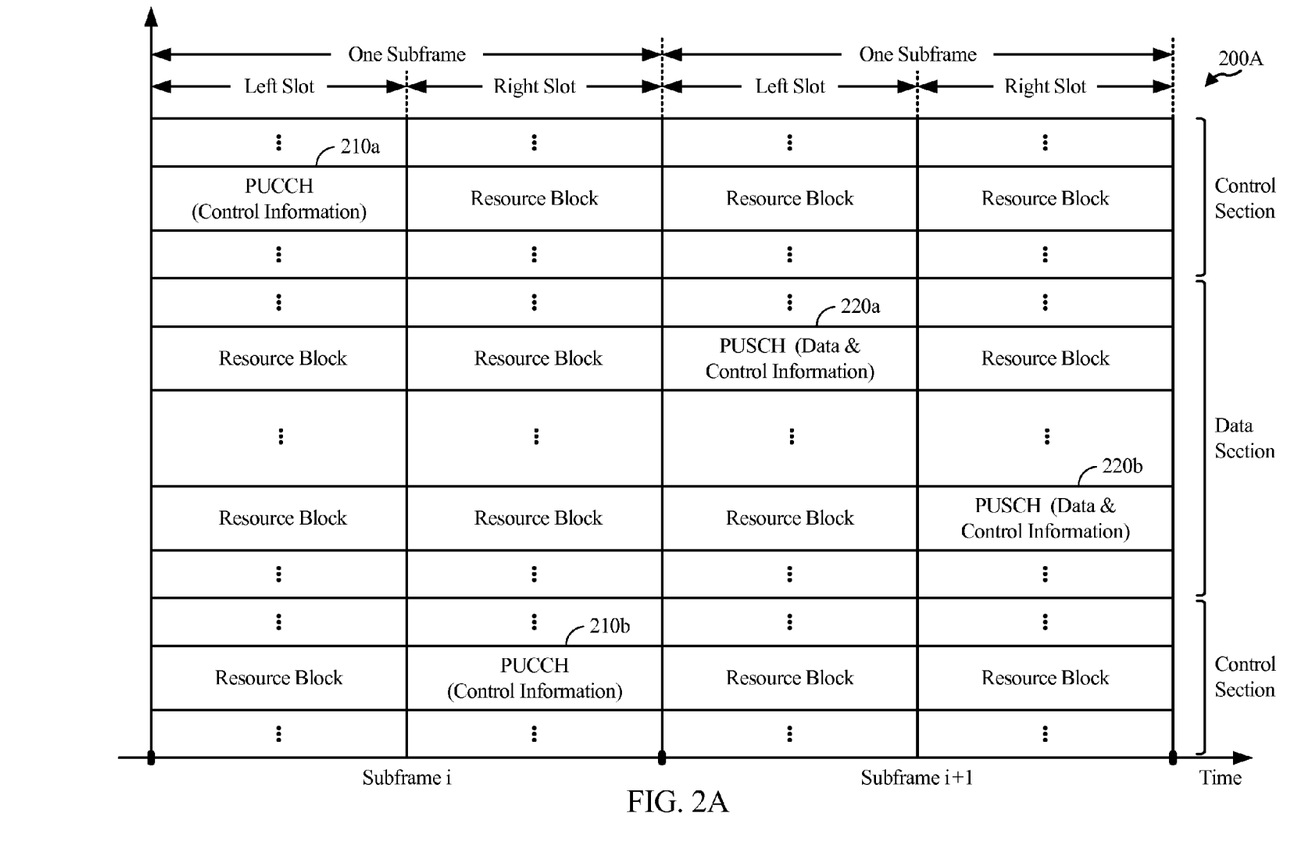
FIG. 2A shows an example format for the uplink in Long Term Evolution (LTE) in accordance with certain aspects of the present disclosure.

FIG. 2A shows an exemplary format 200A for the uplink in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 2A results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the Node B. The UE may transmit control information in a Physical Uplink Control Channel (PUCCH) 210a, 210b on the assigned resource blocks in the control section. The UE may transmit data or both data and control information in a Physical Uplink Shared Channel (PUSCH) 220a, 220b on the assigned resource blocks in the data section. An uplink transmission may span both slots of a subframe and may hop across frequency as shown in FIG. 2A.

A UE may be within the coverage of multiple eNBs. One of these eNBs may be selected to serve the UE. The serving eNB may be selected based on various criteria such as received power, path loss, signal-to-noise ratio (SNR), etc.

A UE may operate in a dominant interference scenario in which the UE may observe high interference from one or more interfering eNBs. A dominant interference scenario may occur due to restricted association. For example, in FIG. 1, UE 120y may be close to femto eNB 110y and may have high received power for eNB 110y. However, UE 120y may not be able to access femto eNB 110y due to restricted association and may then connect to macro eNB 110c with lower received power (as shown in FIG. 1) or to femto eNB 110z also with lower received power (not shown in FIG. 1). UE 120y may then observe high interference from femto eNB 110y on the downlink and may also cause high interference to eNB 110y on the uplink.

A dominant interference scenario may also occur due to range extension, which is a scenario in which a UE connects to an eNB with lower path loss and lower SNR among all eNBs detected by the UE. For example, in FIG. 1, UE 120x may detect macro eNB 110b and pico eNB 110x and may have lower received power for eNB 110x than eNB 110b. Nevertheless, it may be desirable for UE 120x to connect to pico eNB 110x if the path loss for eNB 110x is lower than the path loss for macro eNB 110b. This may result in less interference to the wireless network for a given data rate for UE 120x.

In an aspect, communication in a dominant interference scenario may be supported by having different eNBs operate on different frequency bands. A frequency band is a range of frequencies that may be used for communication and may be given by (i) a center frequency and a bandwidth or (ii) a lower frequency and an upper frequency. A frequency band may also be referred to as a band, a frequency channel, etc. The frequency bands for different eNBs may be selected such that a UE can communicate with a weaker eNB in a dominant interference scenario while allowing a strong eNB to communicate with its UEs. An eNB may be classified as a "weak" eNB or a "strong" eNB based on the relative received power of signals from the eNB received at a UE (and not based on the transmit power level of the eNB).

Figure 3:
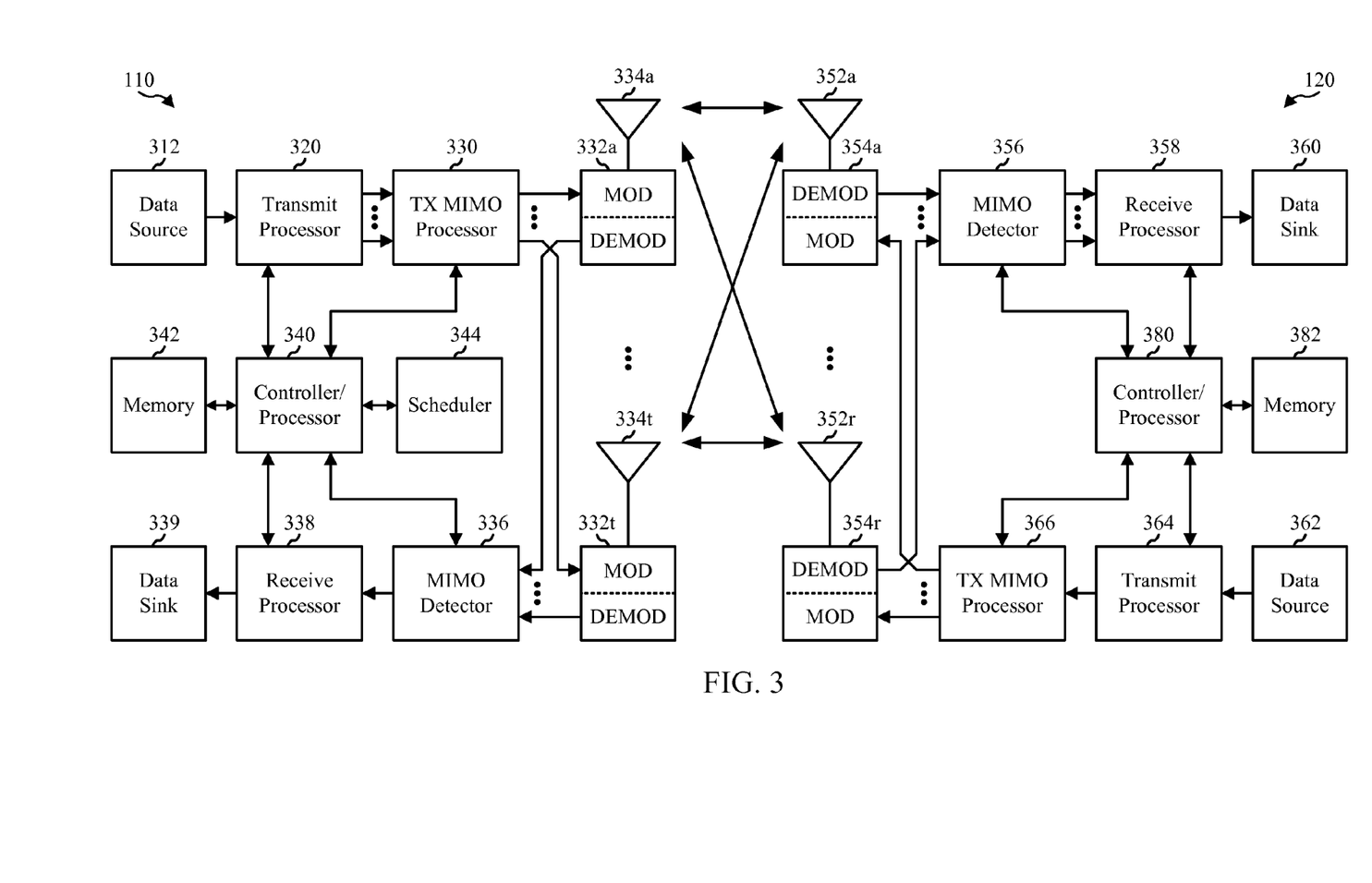
FIG. 3 shows a block diagram conceptually illustrating an example of a Node B in communication with a user equipment device (UE) in a wireless communications network in accordance with certain aspects of the present disclosure.

FIG. 3 shows a block diagram of a design of a base station or an eNB 110 and a UE 120, which may be one of the base stations/eNBs and one of the UEs in FIG. 1. For a restricted association scenario, the eNB 110 may be macro eNB 110c in FIG. 1, and UE 120 may be UE 120y. The eNB 110 may also be a base station of some other type. The eNB 110 may be equipped with T antennas 334a through 334t, and the UE 120 may be equipped with R antennas 352a through 352r, where in general T≥1 and R≥1.

At the eNB 110, a transmit processor 320 may receive data from a data source 312 and control information from a controller/processor 340. The control information may be for the PBCH, PCFICH, PHICH, PDCCH, etc. The data may be for the PDSCH, etc. The transmit processor 320 may process (e.g., encode and symbol map) the data and control information to obtain data symbols and control symbols, respectively. The transmit processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide T output symbol streams to T modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively.

At the UE 120, antennas 352a through 352r may receive the downlink signals from the eNB 110 and may provide received signals to demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all R demodulators 354a through 354r, perform MIMO detection on the received symbols, if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from the transmit processor 364 may be precoded by a TX MIMO processor 366 if applicable, further processed by modulators 354a through 354r (e.g., for SC-FDM, etc.), and transmitted to the eNB 110. At the eNB 110, the uplink signals from the UE 120 may be received by antennas 334, processed by demodulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340, 380 may direct the operation at the eNB 110 and the UE 120, respectively. The controller/processor 380 and/or other processors and modules at the UE 120 may perform or direct operations for blocks 700 in FIG. 7, and/or other processes for the techniques described herein. The memories 342 and 382 may store data and program codes for base station 110 and UE 120, respectively. A scheduler 344 may schedule UEs for data transmission on the downlink and/or uplink.

Example Methods and Apparatus for Generating Demodulation Candidates Using Vector Candidate Sampling (VCS)

As discussed above, a MIMO system generally achieves higher throughputs by using multiple antennas at the transmitter and the receiver, which in turn enables transmission and reception of multiple independent data streams (or layers) between the transmitter and the receiver simultaneously. For example, LTE category 5 supports 4×4 MIMO with 4 transmit antennas at a base station and 4 receive antennas at a mobile receiver. In 4×4 MIMO, up to 4 simultaneous layers of information may be sent in parallel.

In certain aspects, a notation may be used where y is the received data vector, H is the channel matrix, x is the transmit data vector, and n is the noise vector. y may be given by:

$$y=Hx+n$$

Each element in the vector x belongs to a signal constellation. In LTE category 5, the maximum constellation size is 64-QAM, which means each element in x has up to 6 bits which gives 64 different hypotheses per layer.

In MIMO demodulation, a maximum a posteriori (MAP) receiver generally has optimal performance and requires evaluating the likelihood of every possible candidate. However, this may not be feasible for 4×4 MIMO systems since it would require evaluating approximately 16 million candidates.

In certain aspects, a conventional receiver with relatively reduced complexity may be used which estimates x given y. The conventional receiver in 4×4 MIMO may use Minimum Mean Square Error (MMSE) estimation. In an aspect, if F denotes MMSE estimator matrix, then the estimated transmit data vector is given by:

$$\hat{x}=Fy$$

However, performance may be significantly degraded compared to the optimal MAP receiver.

Thus, there is need for a method which approaches the optimal MAP performance with reasonable complexity. Certain aspects of the present disclosure provide methods for MIMO demodulation which may approach the optimal MAP performance with reasonable complexity.

In an aspect, VCS may be used to generate likely candidates for MIMO demodulation. VCS may generate high likelihood candidates with low complexity.

Figure 4:
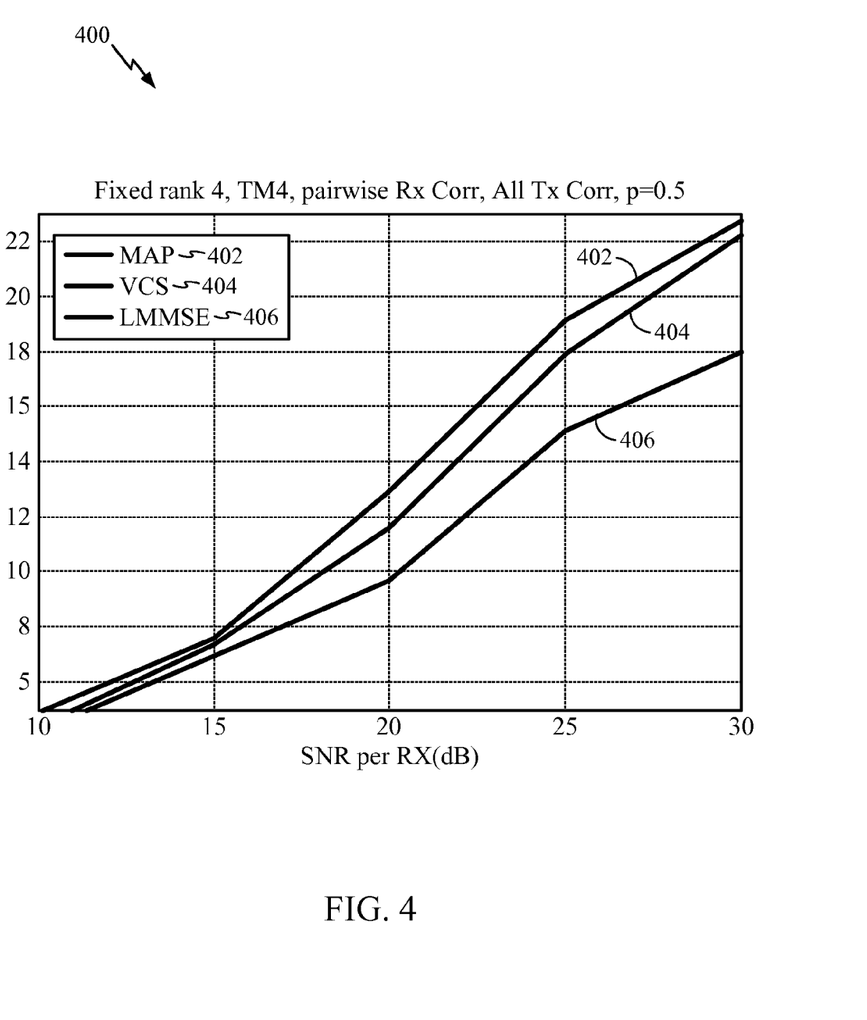
FIG. 4 illustrates a plot comparing performance of VCS with MAP and Linear MMSE (LMMSE), in accordance with certain aspects of the present disclosure.

With VCS, performance may approach the optimal MAP performance. For example, FIG. 4 illustrates a plot 400 comparing performance of VCS with MAP and Linear MMSE (LMMSE) performances, in accordance with certain aspects of the present disclosure. 402 denotes MAP performance which is generally optimal. 404 denotes VCS with 65 candidates and uses the maximum likelihood approximation to evaluate the candidates. 404 denotes a conventional LMMSE solution. As shown, VCS performance approaches MAP performance.

In addition, the complexity of VCS is very low which reduces the modem die area and power consumption. In certain aspects, VCS (assuming the initial LMMSE estimate is pre-calculated) may only require a few additions to generate each candidate.

Exemplary aspects of the present disclosure use a model where y is the received data vector, H is the channel matrix, x is the transmit data vector, and n is the noise vector. This gives the formulation y=Hx+n. High likelihood candidates for MIMO demodulation may be generated as follows.

First, the receive data vector y may be recorded. In LTE, y is typically captured once per resource element which corresponds to a frequency subcarrier and OFDM symbol. For example, in 4×4 MIMO, v is a length 4 vector.

Next, the estimator matrix F may be calculated, which estimates the transmitted x vector given the received y vector. In the current aspect, F is the conventional MMSE (minimum mean squared error) matrix. However, F may be an approximation of the MMSE matrix or the channel inverse $H^{-1}$. For example, F may include an LMMSE matrix, an approximation of the LMMSE matrix, a channel matrix inversion estimator, or an approximation of the channel matrix inversion estimator.

For each candidate n, a perturb vector $p_n$ may be added to the receive data vector y. In an aspect, the perturb vector $p_x$ may be a random vector, a pseudo random vector, or a vector optimized for demodulation performance In an aspect the perturb vector may be selected from a set of perturb vectors, the number of perturb vectors in the set being equal to the number of likely candidates to be determines In an aspect, a different perturb vector may be used for each candidate n.

To generate the candidate n, the estimated transmit data vector (a likely candidate) may be given as $\hat{x}_n = \text{slice}(F(y+p_n))$. In an aspect, Fy may be calculated once since the result is used for all candidates. $Fp_n$, on the other hand, may be calculated once per candidate using a matrix-vector multiply. In order to reduce complexity, $p_n$ may be set to all zeros except one non-zero component. The slice function selects the nearest constellation point (e.g. one of 64 points in 64-QAM for each component).

Finally, the likelihood ratios for each bit may be calculated. The likelihood ratios may then be used by the decoder to determine the transmitted bits.

Using VCS with Maximum Likelihood

In certain aspects, VCS may be used to calculate the LLRs (log likelihood ratios) with the maximum likelihood approximation. For example, FIG. 5 illustrates a block diagram 500 showing calculation of LLRs with maximum likelihood approximation using VCS, in accordance with certain aspects of the present disclosure.

Figure 5:
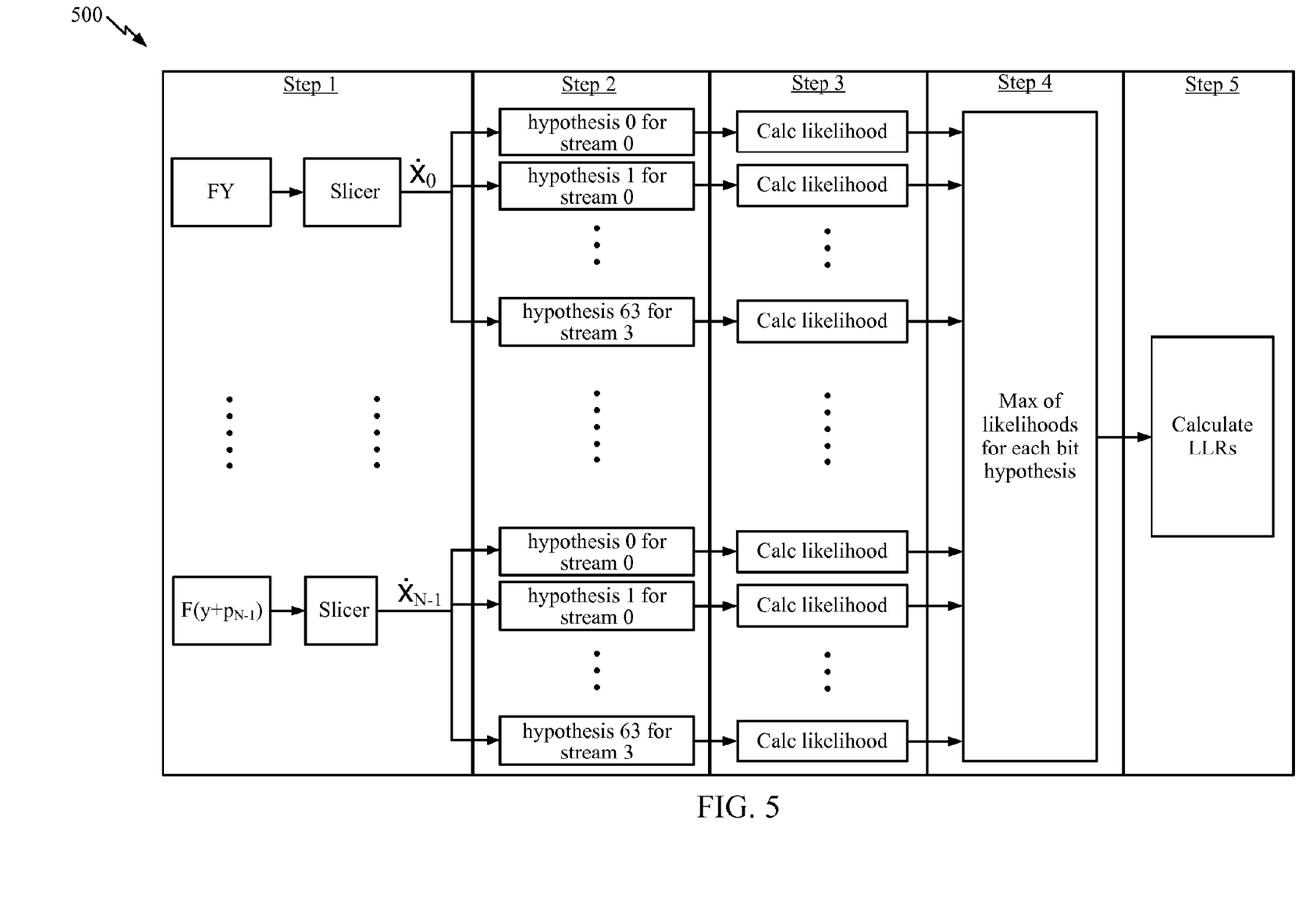
FIG. 5 illustrates a block diagram showing calculation of LLRs with maximum likelihood approximation using VCS, in accordance with certain aspects of the present disclosure

As shown in FIG. 5, a first processing step (Step 1) may include generating vector candidate samples $x_0$-$x_{N-1}$ for a receive data vector recorded at a receiver, as discussed in the previous section. A second processing step (Step 2) may include generating maximum likelihood hypotheses for each candidate x using a conventional method. For example, in 4×4 MIMO 64-QAM, 64 hypotheses may be generated for each layer for a total of 256 hypotheses per candidate. A third processing step (Step 3) may include calculating likelihood for each bit hypotheses generated in the previous step. For example, the likelihood may be calculated using a multivariate normal probability density function. In an aspect, in practice, the exact likelihood is not calculated, and an approximation is used instead.

A fourth processing step (Step 4) may include determining the maximum of the likelihoods for each bit hypothesis. In an aspect, the maximum likelihood is used because it approximates the true likelihood for each bit hypothesis.

Finally, a fifth processing step (Step 5) may include determining the LLRs (log likelihood ratios) by subtracting the log likelihoods for each bit equal to one and each bit equal to zero. In an aspect, the determined log likelihood is the maximum of the log likelihoods found in step 4.

Using VCS for Interference Cancellation

In certain aspects, VCS may be used to estimate and remove the interferers from the demodulated stream. For example, FIG. 6 illustrates a block diagram 600 for using VCS to estimate and remove interferers from a demodulated stream, in accordance with certain aspects of the present disclosure.

Figure 6:
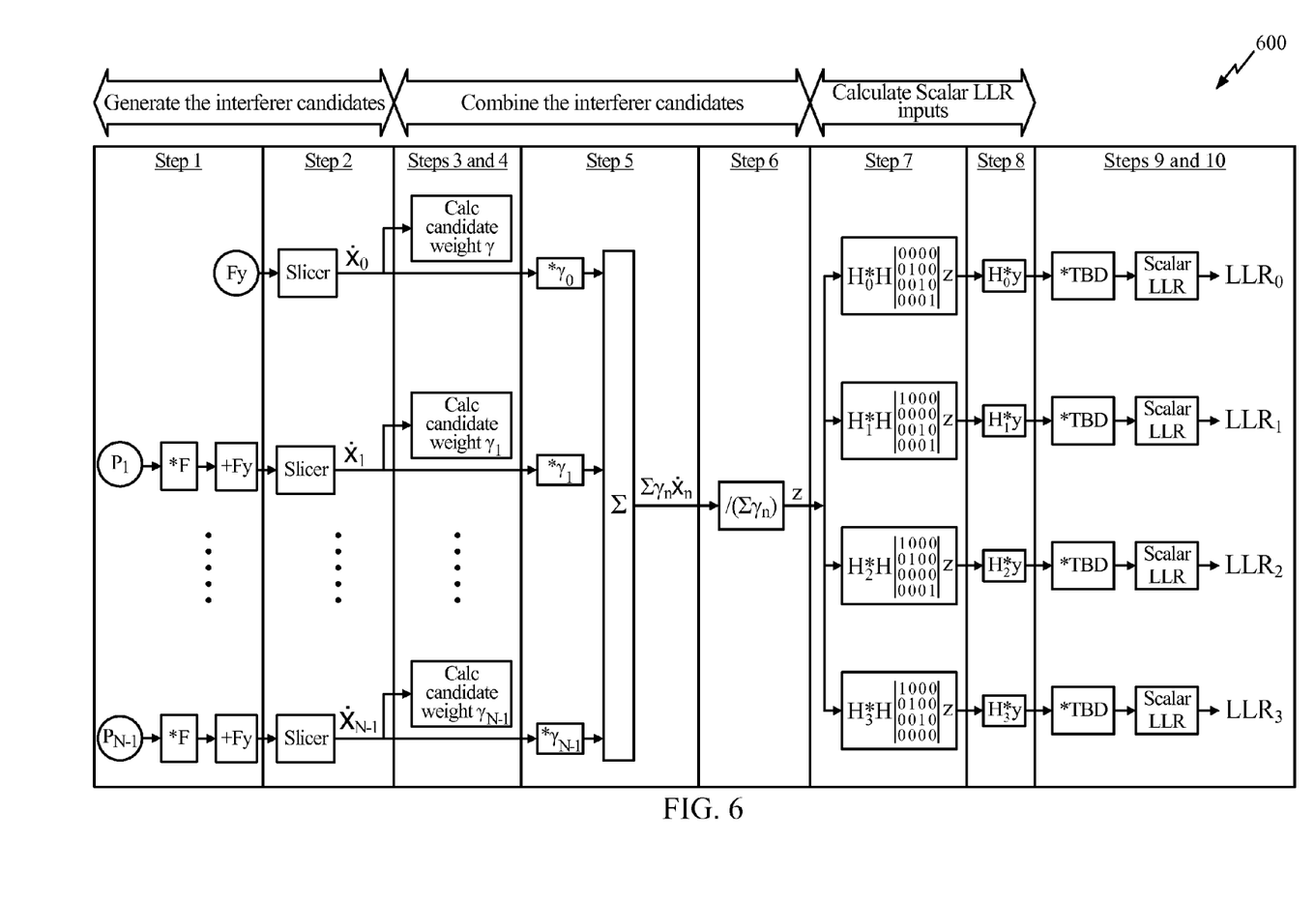
FIG. 6 illustrates a block diagram for using VCS to estimate and remove interferers from a demodulated stream, in accordance with certain aspects of the present disclosure

As shown in FIG. 6, a first processing may include generating interferer candidates $x_0$-$x_{N-1}$ by using the VCS technique discussed above. The first processing step may include Step 1 for applying a perturb vector to each candidate and estimating a transmit data vector corresponding to the candidate. A Step 2 may include applying a slicing function to obtain the likely interferer candidate.

A next processing step may include combining the interferer candidates from the previous step. For example, Steps 3 and 4 calculate a candidate weight γ for each interferer candidate. In an exemplary aspect, the optimal weights may be found through simulation, and weight of a candidate may be set based on the likelihood the candidate was transmitted. Steps 5 and 6 may combine the candidates using a weighted average to form an interference estimate z. The interference estimate generally includes all layers transmitted. For example in a rank 4 MIMO system, z is of length 4. In an aspect, for each demodulated layer, the demodulated layer is masked out from the interference estimate z. For example, while demodulating layer 0 in rank 4 MIMO, component 0 may be masked out and only components 1, 2, and 3 from z may be used.

A final processing step may include calculating scalar LLR inputs. For example, Steps 7 through 10 determine the LLRs, given the interference estimate z.

The estimated interferers may then be removed from the received signal to obtain the required demodulated stream.

Figure 7:
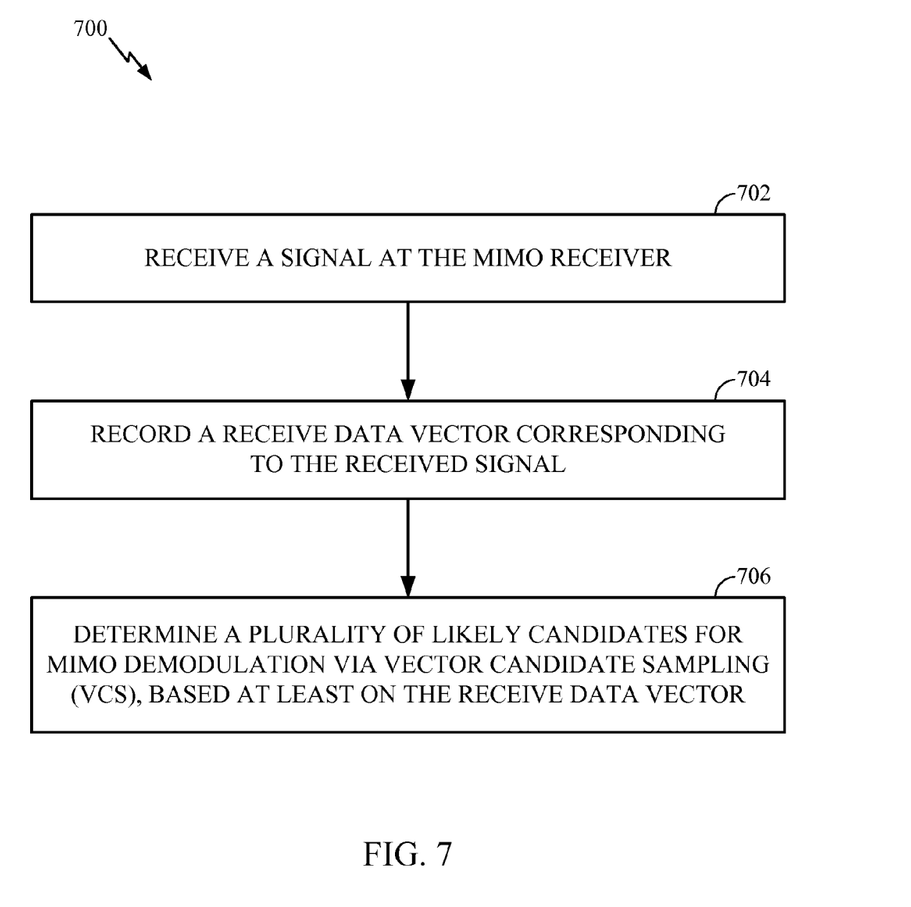
FIG. 7 is a flow diagram illustrating operations by a MIMO receiver for determining a plurality of likely candidates for MIMO demodulation, in accordance with certain aspects of the present disclosure.

FIG. 7 is a flow diagram illustrating operations 700 by a MIMO receiver for determining a plurality of likely candidates for MIMO demodulation, in accordance with certain aspects of the present disclosure. Operations 700 may begin, at 702, by receiving a signal at the MIMO receiver. At 704, a receive data vector corresponding to the received signal may be recorded. At 706, a plurality of likely candidates may be determined for MIMO demodulation via VCS, based at least on the receive data vector.

In certain aspects, for determining the plurality of likely candidates, the MIMO receiver may perturb the receive data vector for each candidate based on a pre-determined perturb vector, and estimate a corresponding transmit data vector based at least on the perturbed receive data vector for the candidate and an estimator matrix, wherein a likely candidate includes the estimated transmit data vector. In an aspect the perturb vector may be selected from a set of perturb vectors, the number of perturb vectors in the set being equal to the number of likely candidates to be determined In an aspect, a different perturb vector is used for each likely candidate. In an aspect, each perturb vector includes a random vector, a pseudo random vector, or a vector optimized for demodulation performance.

In certain aspects, the estimator matrix estimates a transmitted vector for a given received vector. In an aspect, the estimator matrix includes a Linear Minimum Mean Squared Error (LMMSE) matrix, an approximation of the LMMSE matrix, a channel matrix inversion estimator, or an approximation of the channel matrix inversion estimator.

In certain aspects, for estimating the transmit data vector, the MIMO receiver employs a slicing function to select a nearest constellation point for the transmit data vector in a vector space.

In certain aspects, the receiver data vector is captured once per resource element.

In certain aspects, operations 700 may include calculating likelihood ratios for each likely candidate for use by a decoder to determine transmitted bits.

The various operations of methods described above may be performed by any suitable means capable of performing the corresponding functions. The means may include various hardware and/or software component(s) and/or module(s), including, but not limited to a circuit, an application specific integrated circuit (ASIC), or processor.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method of wireless communication by a Multiple-Input Multiple-Output (MIMO) receiver, comprising:
   receiving a signal at the MIMO receiver;
   recording a receive data vector corresponding to the received signal; and
   determining a plurality of likely candidates for MIMO demodulation via Vector Candidate Sampling (VCS), based at least on the receive data vector,
   wherein the determining a plurality of likely candidates comprises estimating a transmit data vector for each candidate, comprising employing a slicing function to a perturbed receive data vector for the candidate and an estimator matrix, wherein the slicing function selects a nearest constellation point for the transmit data vector in a vector space.

2. The method of claim 1, wherein estimating the transmit data vector for each candidate further comprises:
   perturbing the receive data vector for the candidate based on a pre-determined perturb vector.

3. The method of claim 2, wherein the perturb vector is selected from a set of perturb vectors, a number of perturb vectors in the set being equal to a number of likely candidates to be determined.

4. The method of claim 3, wherein a different perturb vector is used for each likely candidate.

5. The method of claim 3, wherein each perturb vector comprises a random vector, a pseudo random vector, or a vector optimized for demodulation performance.

6. The method of claim 1, wherein the estimator matrix estimates a transmitted vector for a given received vector.

7. The method of claim 6, wherein the estimator matrix comprises a Linear Minimum Mean Squared Error (LMMSE) matrix, an approximation of the LMMSE matrix, a channel matrix inversion estimator, or an approximation of the channel matrix inversion estimator.

8. The method of claim 1, wherein the receive data vector is captured once per resource element.

9. The method of claim 1, further comprising:
calculating likelihood ratios for each likely candidate for use by a decoder to determine transmitted bits.

10. An apparatus for wireless communication by a Multiple-Input Multiple-Output (MIMO) receiver, comprising:
means for receiving a signal;
means for recording a receive data vector corresponding to the received signal; and
means for determining a plurality of likely candidates for MIMO demodulation via Vector Candidate Sampling (VCS), based at least on the receive data vector,
wherein the means for determining a plurality of likely candidates comprises means for estimating a transmit data vector for each candidate that employs a slicing function to a perturbed receive data vector for the candidate and an estimator matrix, wherein the slicing function selects a nearest constellation point for the transmit data vector in a vector space.

11. The apparatus of claim 10, wherein the means for determining the plurality of likely candidates for the MIMO demodulation further comprises:
means for perturbing the receive data vector for the candidate based on a pre-determined perturb vector.

12. The apparatus of claim 11, wherein the perturb vector is selected from a set of perturb vectors, a number of perturb vectors in the set being equal to a number of likely candidates to be determined.

13. The apparatus of claim 12, wherein a different perturb vector is used for each likely candidate.

14. The apparatus of claim 12, wherein each perturb vector comprises a random vector, a pseudo random vector, or a vector optimized for demodulation performance.

15. The apparatus of claim 10, wherein the estimator matrix estimates a transmitted vector for a given received vector.

16. The apparatus of claim 15, wherein the estimator matrix comprises a Linear Minimum Mean Squared Error (LMMSE) matrix, an approximation of the LMMSE matrix, a channel matrix inversion estimator, or an approximation of the channel matrix inversion estimator.

17. The apparatus of claim 10, wherein the receive data vector is captured once per resource element.

18. The apparatus of claim 10, further comprising:
means for calculating likelihood ratios for each likely candidate for use by a decoder to determine transmitted bits.

19. An apparatus for wireless communication by a Multiple-Input Multiple-Output (MIMO) receiver, comprising:
at least one processor configured to:
receive a signal at the MIMO receiver;
record a receive data vector corresponding to the received signal; and
determine a plurality of likely candidates for MIMO demodulation via Vector Candidate Sampling (VCS), based at least on the receive data vector,
wherein the at least one processor determines the plurality of likely candidates by estimating a transmit data vector for each candidate, comprising employing a slicing function to a perturbed receive data vector for the candidate and an estimator matrix, wherein the slicing function selects a nearest constellation point for the transmit data vector in a vector space; and
a memory coupled to the at least one processor.

20. A computer program product for wireless communication by a Multiple-Input Multiple-Output (MIMO) receiver, comprising:
a non-transitory computer-readable medium comprising instructions for:
receiving a signal at the MIMO receiver;
recording a receive data vector corresponding to the received signal; and
determining a plurality of likely candidates for MIMO demodulation via Vector Candidate Sampling (VCS), based at least on the receive data vector,
wherein the determining a plurality of likely candidates comprises estimating a transmit data vector for each candidate, comprising employing a slicing function to a perturbed receive data vector for the candidate and an estimator matrix, wherein the slicing function selects a nearest constellation point for the transmit data vector in a vector space.

* * * * *